United States Patent
Sugimoto et al.

(10) Patent No.: US 8,161,762 B2
(45) Date of Patent: Apr. 24, 2012

(54) REFRIGERATOR

(75) Inventors: Shuhei Sugimoto, Shiga (JP); Tetsuya Saito, Osaka (JP); Akihiro Shirono, Shiga (JP)

(73) Assignee: Panasonic Corporation, Osaka (JP)

( * ) Notice: Subject to any disclaimer, the term of this patent is extended or adjusted under 35 U.S.C. 154(b) by 1019 days.

(21) Appl. No.: 10/585,381

(22) PCT Filed: Jan. 6, 2005

(86) PCT No.: PCT/JP2005/000321
§ 371 (c)(1),
(2), (4) Date: Apr. 30, 2009

(87) PCT Pub. No.: WO2005/066560
PCT Pub. Date: Jul. 21, 2005

(65) Prior Publication Data
US 2009/0301115 A1 Dec. 10, 2009

(30) Foreign Application Priority Data
Jan. 8, 2004 (JP) .................................. 2004-002732

(51) Int. Cl.
*F25B 39/04* (2006.01)
*F25D 17/00* (2006.01)
*F28F 1/36* (2006.01)

(52) U.S. Cl. .............................. 62/181; 62/183; 165/184
(58) Field of Classification Search .................... 62/183, 62/181; 165/183, 184, 182
See application file for complete search history.

(56) References Cited

U.S. PATENT DOCUMENTS 5,033,544 A * 7/1991 Abbott ........................... 165/184
7,367,380 B2 * 5/2008 Lee et al. ......................... 165/67

FOREIGN PATENT DOCUMENTS

| JP | 61-106785 | 7/1986 |
| JP | 07-167547 | 7/1995 |
| JP | 08-189752 | 7/1996 |
| JP | 10-073362 | 3/1998 |
| JP | 1999-159941 | 6/1999 |
| JP | 2001-255048 | 9/2001 |
| JP | 2003-287334 | 10/2003 |

OTHER PUBLICATIONS

International Search Report for Corresponding International Application No. PCT/JP2005/00321 dated Apr. 26, 2005.

* cited by examiner

*Primary Examiner* — Marc Norman
(74) *Attorney, Agent, or Firm* — RatnerPrestia

(57) ABSTRACT

A refrigerator includes a housing including a cooling compartment and a machine compartment, a refrigeration cycle provided in the housing and including a compressor, a condenser, a decompressor, and an evaporator which provide a refrigerant path, a refrigerant provided in the refrigeration cycle and flowing in the refrigerant path, and a blower for cooling the condenser. The condenser includes a pipe and a fin mounted on the pipe. The pipe is formed to have a helical shape with gaps. The helical shape has an inner space, a first opening, and a second opening opposite to the first opening. The inner space has a substantially cylindrical shape between the first opening and the second opening. The first opening faces the blower. A flow resistance between the second opening and the inner space is larger than a flow resistance between the gaps of the helical shape and the inner space. The refrigerator prevents the pipe of the condenser from being broken, accordingly preventing leakage of the refrigerant due to the breaking.

19 Claims, 15 Drawing Sheets

Fig. 17 PRIOR ART
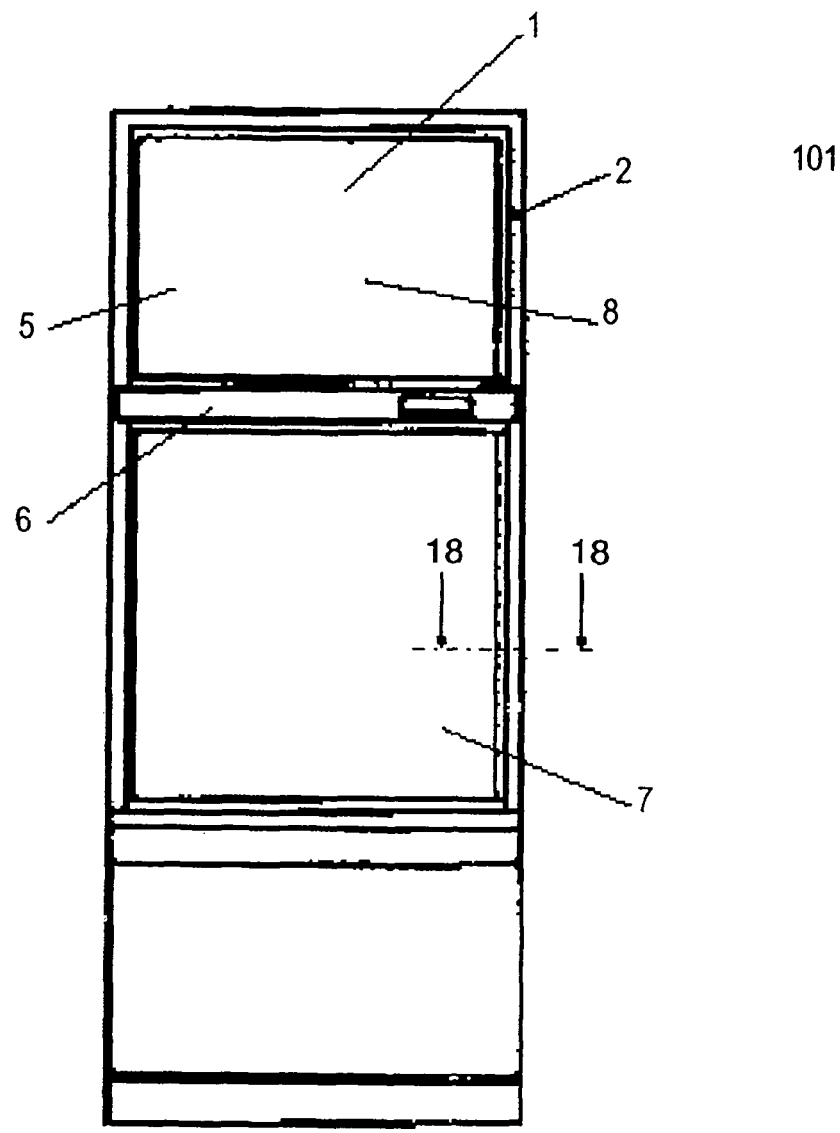
Fig. 18 PRIOR ART
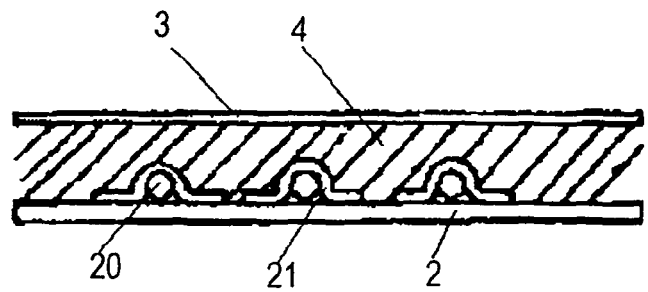

Fig. 19 PRIOR ART
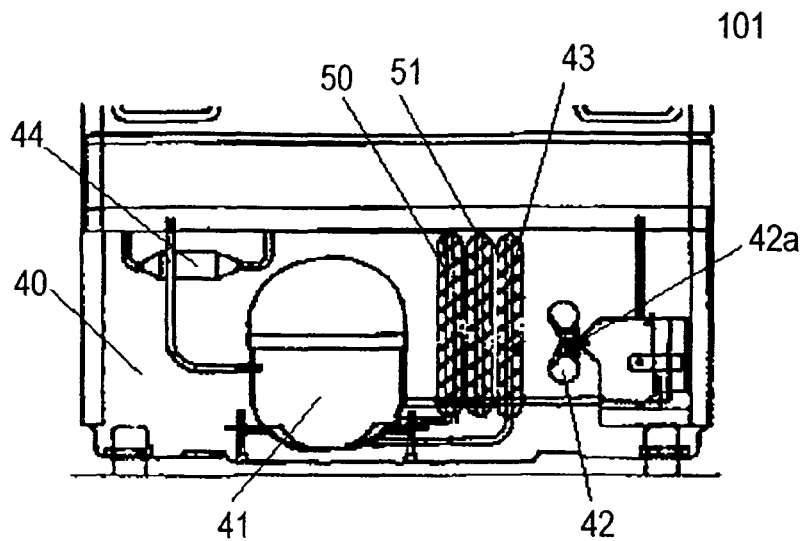
Fig. 20 PRIOR ART
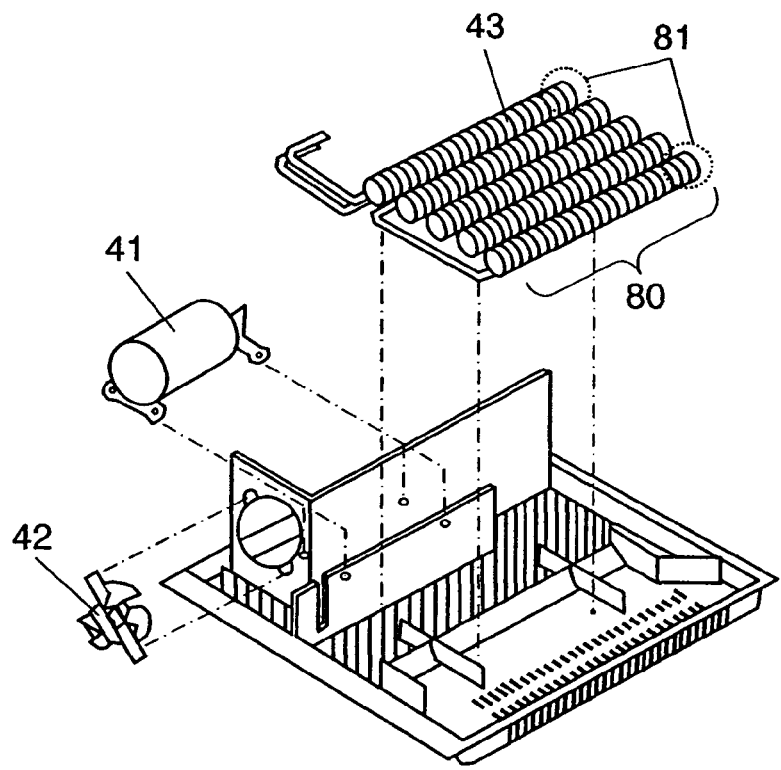

US 8,161,762 B2

REFRIGERATOR

THIS APPLICATION IS A U.S. NATIONAL PHASE APPLICATION OF PCT INTERNATIONAL APPLICATION NO. PCT/JP2005/000321, FILED JAN. 6, 2005.

TECHNICAL FIELD

The present invention relates to a refrigerator which has a refrigeration cycle with a condenser which is forcefully cooled down.

BACKGROUND ART

FIG. 17 is a front view of a conventional refrigerator 1 disclosed in Japanese Patent Laid-Open Publication No. 2001-255048. FIG. 18 is a cross sectional view of the refrigerator 1 at line 18-18 shown in FIG. 17. FIG. 19 is a front view of a machine compartment 40 in the refrigerator 1. The refrigerator 1 includes a heat-insulating housing 5. The heat-insulating housing 5 includes an outer box 2 providing an outer wall, an inner box 3 providing an inner wall, and a urethane insulator 4 foamed between the outer box 2 and the inner box 3. The heat-insulating housing 5 is separated by a partition wall 6 into upper and lower sections to be a refrigerator compartment 7 and a freezer compartment 8, respectively. A condenser 20 is attached to an inner side of the outer box 2 with heat-conductive adhesive tapes 21, such as aluminum foil strips, for causing the outer box 2 to radiate heat from the condenser 20. The machine compartment 40 is located at the lower rear of the refrigerator 1 and accommodates a compressor 41, a blower 42, a condenser 43, a dryer 44, and a capillary tube (not shown) which provide a refrigeration cycle. The condenser 43 includes a pipe 51 in which a refrigerant runs and fins 50 fixed onto the pipe 51 for radiation of heat from the pipe 51. The pipe 51 is wound densely. The blower 42, the condenser 43, and the compressor 41 are arranged in this order from a wall of the machine compartment 40. This arrangement allows the condenser 43 to receive air directly from the blower 42 for increasing its efficiency of heat exchange and thus its heat radiating capability.

The condenser 43 in the machine compartment 40 is located at the downstream of air from the blower 42. The air from the blower 42 flows into beneath the condenser 43 having a small flow resistance but does not flow sufficiently towards the condenser 43. The air above the condenser 43 is located far away from a rotation axis 42a of the blower 42. The condenser 43 interrupts the flow of the air, and accordingly reduces the speed of the flow and allows the air to be partially trapped, thus decreasing efficiency of heat exchange. The trapping of the air causes dusts or dirt sneaked into the machine compartment 40 to remain and to be accumulated on the fins 50 and the pipe 51 of the condenser 43, and accordingly decreases the heat radiation capability during a long-time operation. This increases a condensation temperature and a compression ratio, and decreases a coefficient of performance (COP), a primary energy conversion rate, which is the ratio of the refrigerating capability to the power consumption, accordingly increasing an overall power consumption of the refrigerator 1.

FIG. 20 is a perspective view of a machine compartment 40A of another conventional refrigerator 1A disclosed in Japanese Patent Laid-Open Publication No. 7-167547. A condenser 43A includes a straight portion 80 and bent portions 81 for allowing the condenser to be installed in a thin space at the bottom of the refrigerator 1A. This increases the area for radiation of heat and a heat radiating efficiency.

The condenser 43A is installed in the thin space, the bottom of the refrigerator 1A. In order to provide the condenser 42 with a long overall

BRIEF DESCRIPTION OF THE DRAWINGS

FIG. 17 is a plan view of a conventional refrigerator.

FIG. 18 is a cross sectional view of the conventional refrigerator at line 18-18 shown in FIG. 17.

FIG. 19 is a front view of a machine compartment of another conventional refrigerator.

FIG. 20 is a perspective view of the machine compartment of the refrigerator shown in FIG. 19.

DETAIL DESCRIPTION OF THE PREFERRED EMBODIMENTS

Exemplary Embodiment 1

Figure 1:
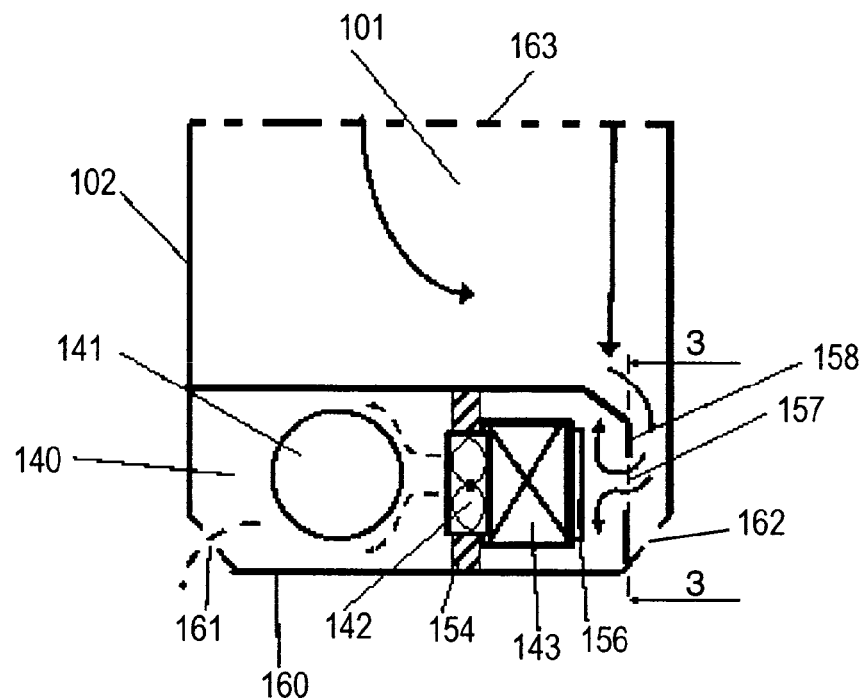
FIG. 1 is a plan view of a machine compartment of a refrigerator according to Exemplary Embodiment 1 of the present invention.
Figure 2:
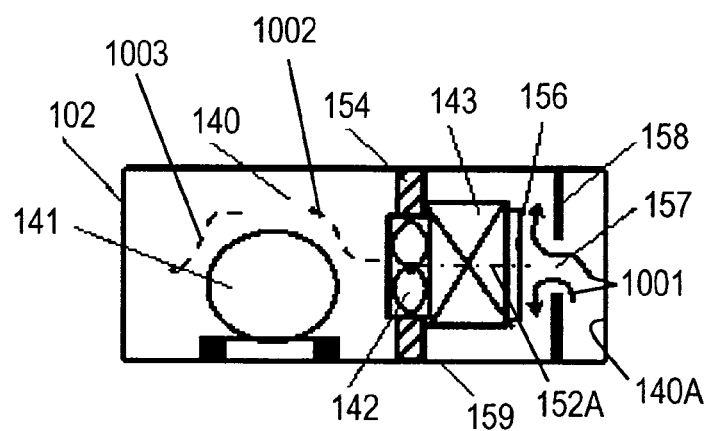
FIG. 2 is a front view of the machine compartment of the refrigerator according to Embodiment 1.
Figure 3:
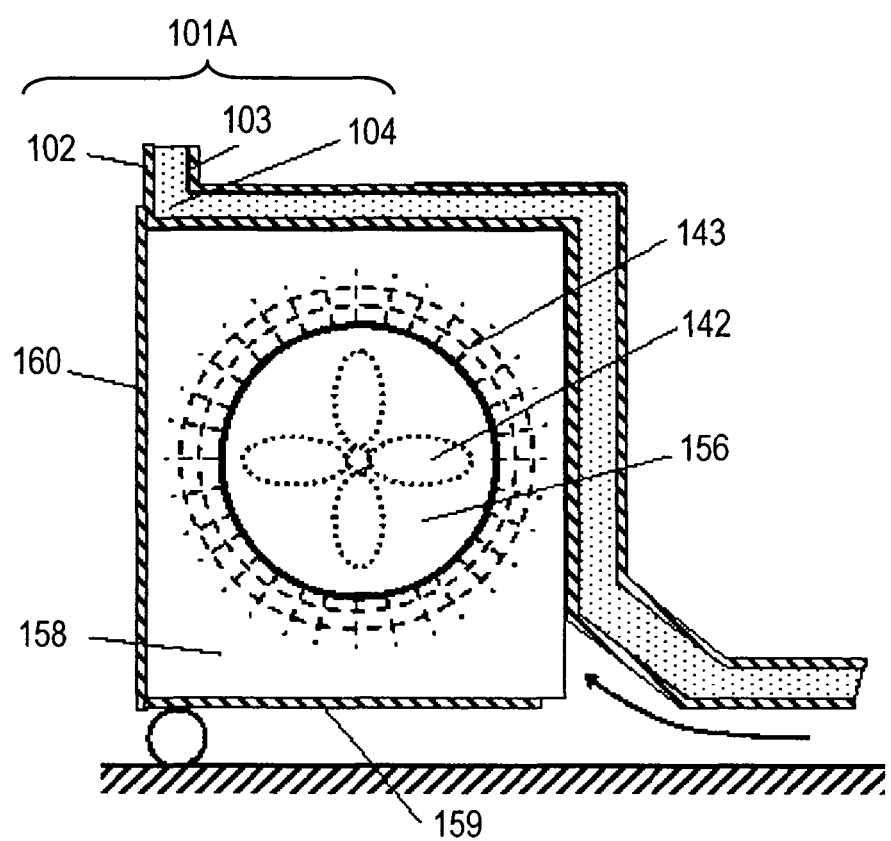
FIG. 3 is a cross sectional view of the refrigerator at line 3-3 shown in FIG. 1.
Figure 4:
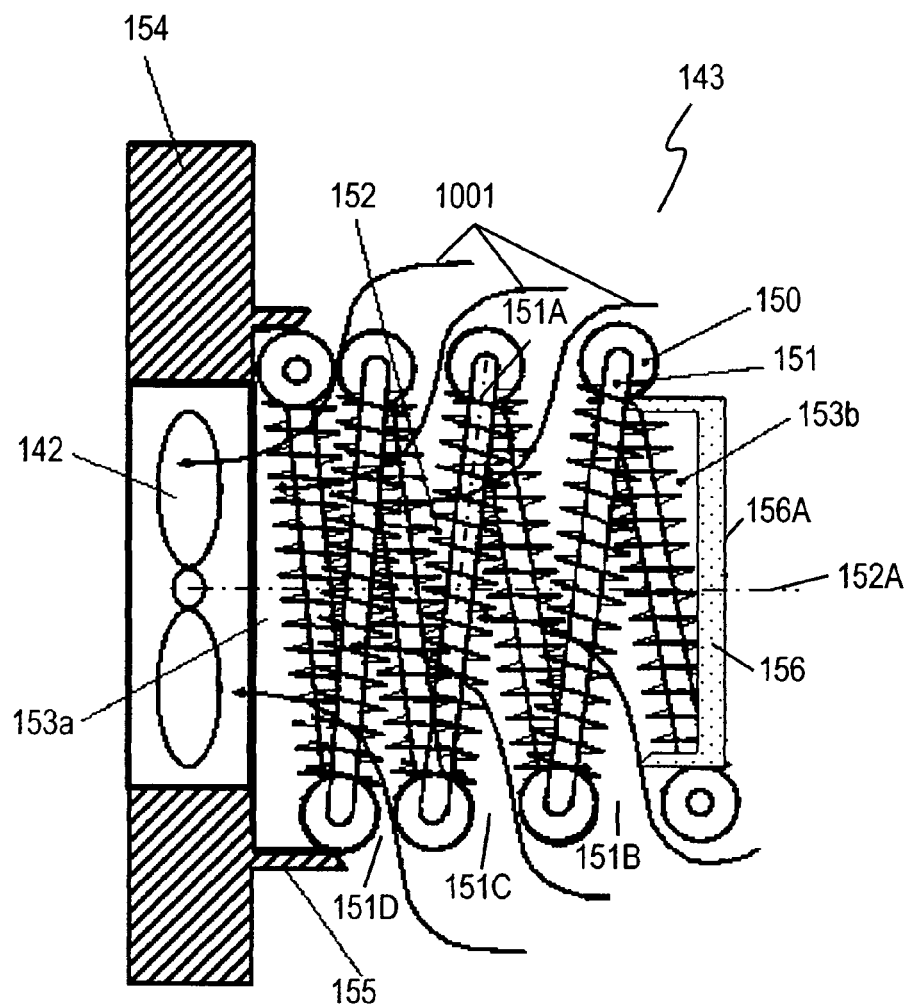
FIG. 4 is a schematic view of a condenser of the refrigerator 101 according to Embodiment 1.
Figure 5A:
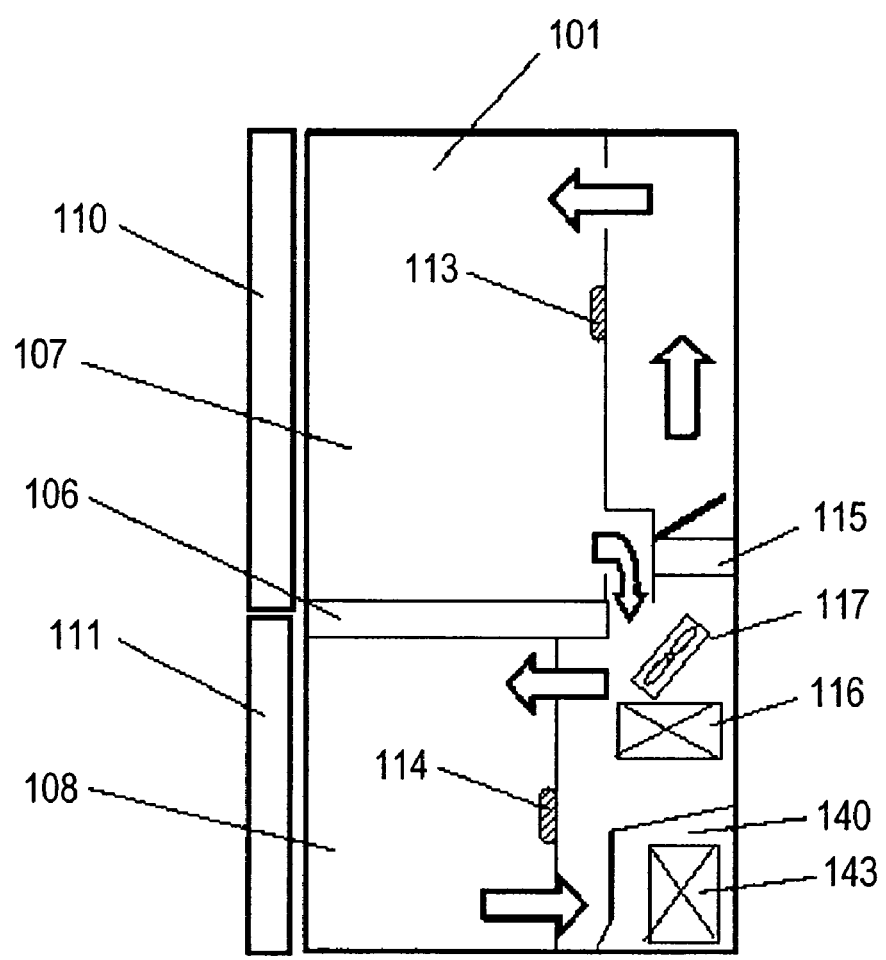
FIG. 5A illustrates an air path of the refrigerator according to Embodiment 1.
Figure 5B:
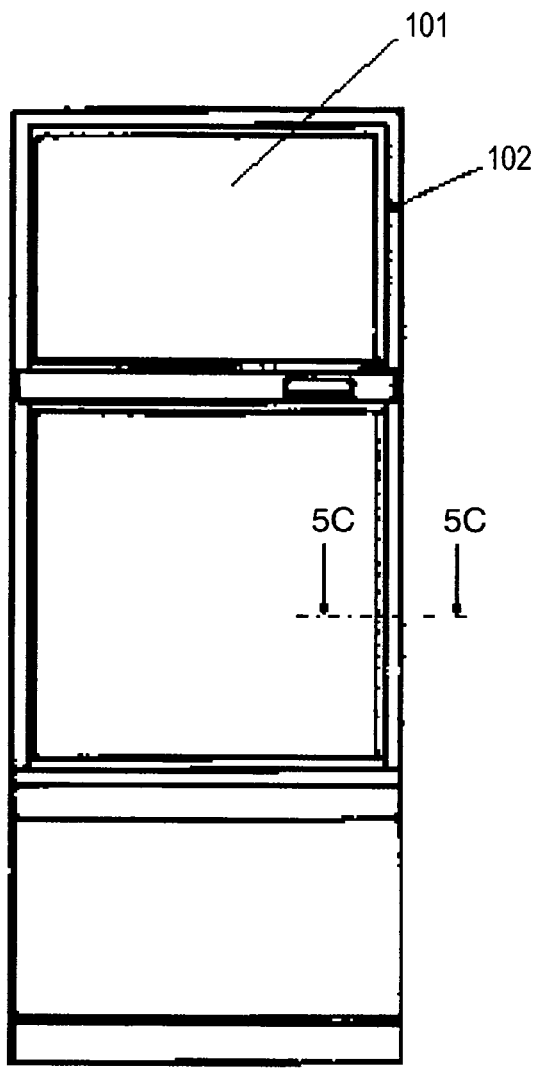
FIG. 5B is a front view of the refrigerator according to Embodiment 1.
Figure 5C:
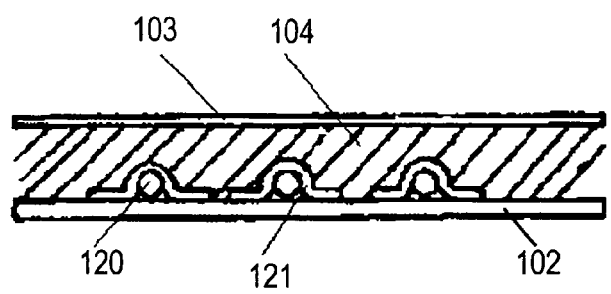
FIG. 5C is a cross sectional view of the refrigerator at line 5C-5C shown in FIG. 5B.

FIG. 1 is a plan view of a machine compartment 140 of a refrigerator 101 according to Exemplary Embodiment 1 of the present invention. FIG. 2 is a front view of the machine compartment 140. FIG. 3 is a cross sectional view of the refrigerator 101 at line 3-3 shown in FIG. 1. FIG. 4 is a schematic view a condenser 143 of the refrigerator 101. FIG. 5A illustrates an air path of the refrigerator 101. FIG. 5B is a front view of the refrigerator 101. FIG. 5C is a cross sectional view of the refrigerator 101 at line 5C-5C shown in FIG. 5B.

Figure 6:
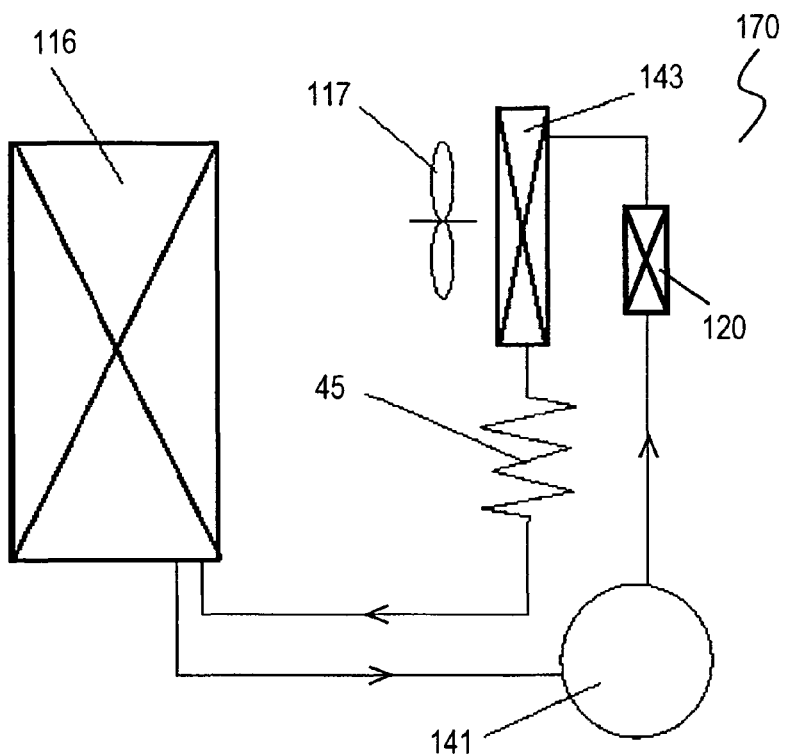
FIG. 6 illustrates a refrigeration cycle of the refrigerator according to Embodiment 1.

FIG. 6 illustrates a refrigeration cycle of the refrigerator 101. The refrigerator 101 includes a heat-insulating housing 101A. The heat-insulating housing 101A includes an outer box 102 made of steel and having an opening at its front, an inner box 103 made of hard resin material, and a heat insulator 104 made of urethane filling between the outer box 102 and the inner box 103. The heat-insulating housing 101A is separated by a partition 106 into a cooling, refrigerator compartment 107 and a freezer compartment 108. The refrigerator compartment 107 and the freezer compartment 108 have doors 110 and 111, respectively. Gaskets seals between the doors 110 and 111 and the heat-insulating housing 101A. Sensors 113 and 114 measure the temperatures in the refrigerator compartment 107 and the freezer compartment 108, respectively. A damper 115 adjusts the amount of cool air introduced into the refrigerator compartment 107. An evaporator 116 mounted on the back of the refrigerator compartment 108 and a fan 117 for blowing air to the evaporator 116 provides a refrigeration cycle 170. The machine compartment 140 is located at the lower rear outside of the refrigerator compartment 101. The machine compartment 140 accommodates therein a compressor 141, a blower 142 for sending air, a condenser 143, a portion of capillary tube (not shown) functioning as a decompressor, and a dryer (not shown) which provide the refrigeration cycle 170. The condenser 143, the blower 142, and the compressor 141 are arranged in this order from the wall 140A of the machine compartment 140 so that the compressor 141 is located at the downstream of air from the blower 142. The heat-insulating housing 101A and the machine compartment 140 provide a cabinet of the refrigerator 101.

As shown in FIG. 4, the condenser 143 includes fin 150 made of thin plate shaped in ribbon and a pipe 151. The fin 150 is fixed on the pipe 151. The fin 150 is arranged substantially perpendicularly to a center axis 151A of the pipe 151 and is formed to have a helical form. The pipe 151 having the fin 150 fixed thereon is arranged in a helical form by gaps 151B, 151C, and 151D which are different from each other. The sizes of the gaps 151B, 151C, and 151D become larger in this order as the gaps are located from an opening 153a to another opening 153b towards the downstream of an air flow 1001. The prep 151 arranged in the helical shape has an inner space 152. The inner space 151 has a substantially tubular shape between the openings 153a and 153b and extends along the center axis 152A from the opening 153a to the opening 153b.

The opening 153a of the inner space 152 faces the blower 142 mounted with screws in a partition 154 dividing the machine compartment 140. The condenser 143 is inserted into and fixed to a supporter 155 provided on the partition 154. A cover 156 is inserted into the opening 153b. More specifically, the opening 153b has a flow resistance of air larger than flow resistances of the opening 153a and the gaps 151B to 151D.

A flow-control plate 158 is provided with an air inlet 157 for introducing air into the machine compartment 140. The plate 158 is located at the upstream of air from the cover 156 along the flow 1001, particularly on the center axis 152A of the inner space 152. The machine compartment 140 is formed by the outer box 102, a base plate 159 having the compressor 141 fixed thereto, and a cover plate 160. The cover plate 160 has a back air inlet 162 and an air outlet 161 for guiding air flows 1002 and 1003 from the blower 142. Air is introduced from front air inlets 163 provided at the front lower portion of the refrigerator 101 into the inside of the machine compartment 140.

As shown in FIGS. 5B and 5C, the condenser 120 is attached onto an inner surface of the outer box 102 with heat-conductive tapes 121, such as aluminum foil strips, for the causing outer box 102 to radiate heat from the condenser 120.

An operation of the refrigerator 101 will be described below.

In the refrigeration cycle 170, a gaseous refrigerant having a high pressure and a high temperature produced by the compressor 141 is conveyed through the condenser 143 in the machine compartment 140 to the condenser 120 attached to the inner surface of the outer box 102. That is, the refrigeration cycle 170 provides a refrigerant path. The gaseous refrigerant is cooled with air around the condenser 143, accordingly liquefying the refrigerant. The liquefied refrigerant is decompressed in the capillary tube 45 and received by the evaporator 116. The evaporator 16 exchanges heat in the liquefied refrigerant with heat in air around the evaporator 116 in the refrigerator compartment 101. The refrigerant is accordingly evaporated and returns back to the compressor 141.

The exchanging of heat performed by the condenser 143 during an operation of the blower 142 will be described in detail. As the compressor 141 operates, the blower 142 is turned on. The pressure of air around the refrigerator 101 communicating with the inside of the machine compartment becomes higher than that of air near the blower 142. Then, the air flows through the front inlets 163, the air inlet 157, and the condenser 143 in this order, and flows in the blower 142. In the machine compartment 140, the air flow 1001 runs from the air inlet 157 along the rotation axis of the blower 142, i.e., the center axis 153A of the inner space 152 of the condenser 143, and reaches a center portion 156A of the cover 156. The cover 156 has a large flow resistance, and accordingly spreads air flow 1001 radially from the center portion 156A of the cover 156 while the air is sucked by the blower 142. The air reaching an outer edge 156B of the cover 156 passes through the gaps 151B, 151C, and 151D of the pipe 151. The gap 151B is larger than the gap 151C, and the gap 151C is larger than the gap 151D, and thus, the gap 151B at the upstream of the flow 1001 has the smallest flow resistance. This causes air flow 1001 to be distributed throughout the longitudinal direction of the inner space 152. The air flows around the pipe 151 and the fin 150 filed onto the pipe 151, and produces a turbulent air flow, hence reducing the thickness of a temperature interface layer. This increases the amount of the exchanged heat, decreases the compression ratio of the refrigerant, and increases a coefficient of performance (COP) of the refrigerant which is the ratio of the cooling capability to the power consumption, accordingly reducing the power consumption of the refrigerator 101.

The air reaching the blower 142 is conveyed as an air flow 1002 to the compressor 141, and cools the compressor 141. The pressure of the air flow 1003 from the compressor 141 is lower than that of the air flow 1002, thus lowering the pressure of the air at the outlet 161 and preventing deterioration of oil and abnormal wear of moving parts. The compressor 141 is prevented from declination of the efficiency of a motor and deterioration of the motor due to a high temperature, thus ensuring a performance and operating reliability.

A pipe of a condenser 43A in a conventional refrigerator 1A shown in FIG. 20 is bent, having a U-shape or an L-shape having a small curvature radius. The condenser 143 of the refrigerator 101 of Embodiment 1 shown in FIG. 4 includes the pipe 150 provided with the fin 150 shaped in helical and is formed to have a helical shape. This shape may be provided by winding the pipe 150 on the outer surface of a tubular jig.

This shape provides the pipe 150 with a large curvature radius. Even when receiving an external stress during the assembling process or the transportation of the refrigerator 101, the pipe 150 is protected from being injured due to metallic fatigue and is prevented from leakage of the refrigerant.

Figure 7:
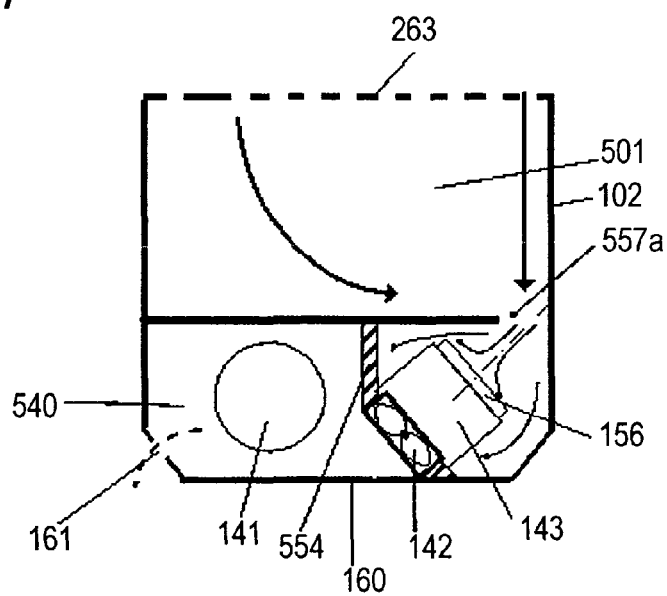
FIG. 7 is a plan view of a machine compartment of another refrigerator according to Embodiment 1.

FIG. 7 is a plan view of a machine compartment 540 of another refrigerator 501 according to Embodiment 1. Embodiment 1. Since the condenser 143 and the blower 142 are arranged with reference to an air inlet 557a similarly to the machine compartment 140 shown in FIG. 1, air flows around the condenser 143 similarly. The condenser 143 has a large heat radiation capability, and reduces the power consumption of the refrigerator 501.

In addition, the fin 150 and the pipe 151 of the condenser 143 may be coated with a heat radiative material to increase its heat radiation capability.

The center axis 152A of the inner space 152 of the condenser 143 is linear, but may be curved or bent, providing the same effects. The pipe 151 of the condenser 143 is shaped in round helix but may be formed in substantially square helix.

Exemplary Embodiment 2

Figure 8:
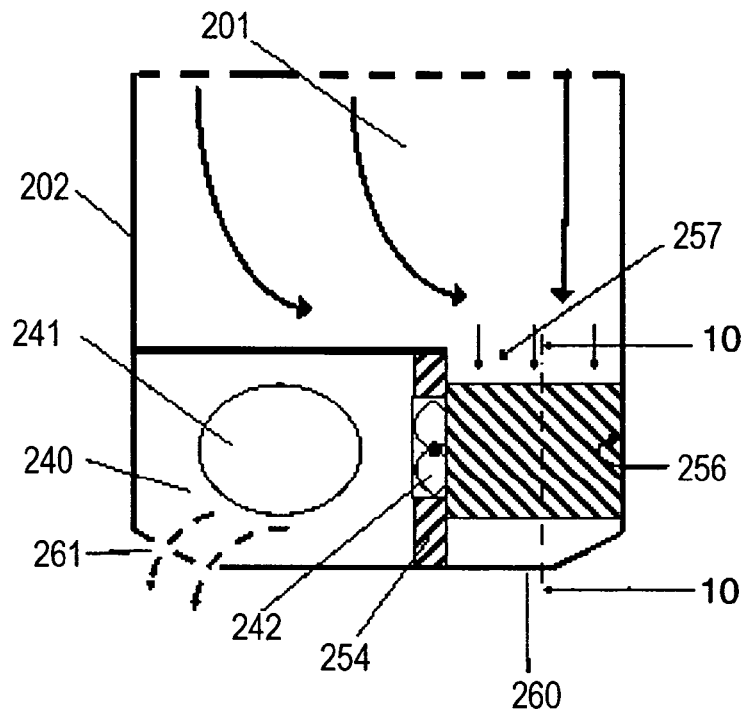
FIG. 8 is a plan view of a machine compartment of a refrigerator according to Exemplary Embodiment 2 of the invention.
Figure 9:
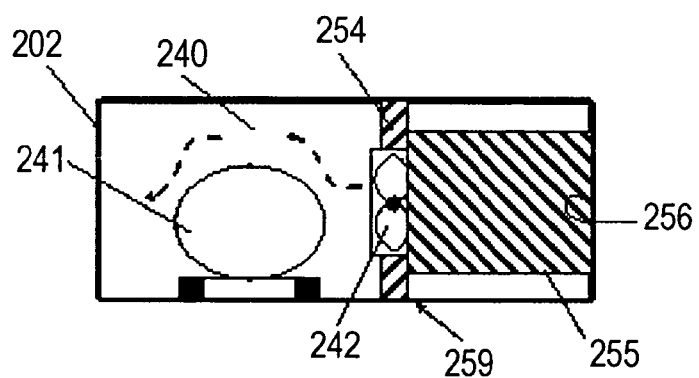
FIG. 9 is a plan view of the machine compartment of the refrigerator according to Embodiment 2.
Figure 10:
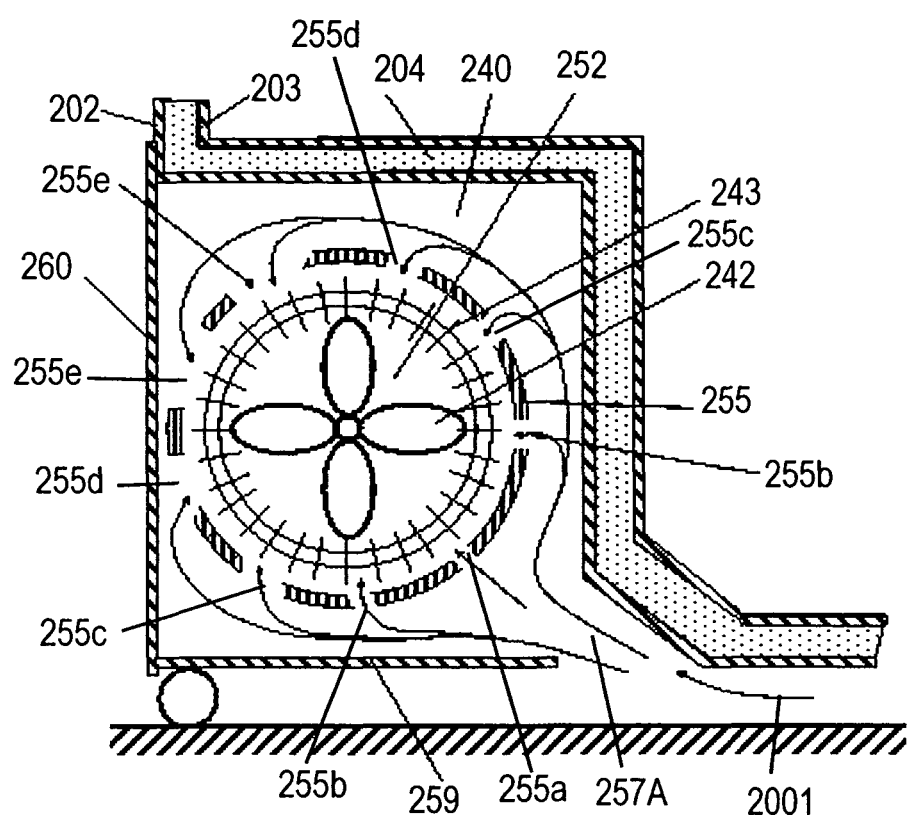
FIG. 10 is a cross sectional view of the refrigerator at line 10-10 shown in FIG. 8.
Figure 11:
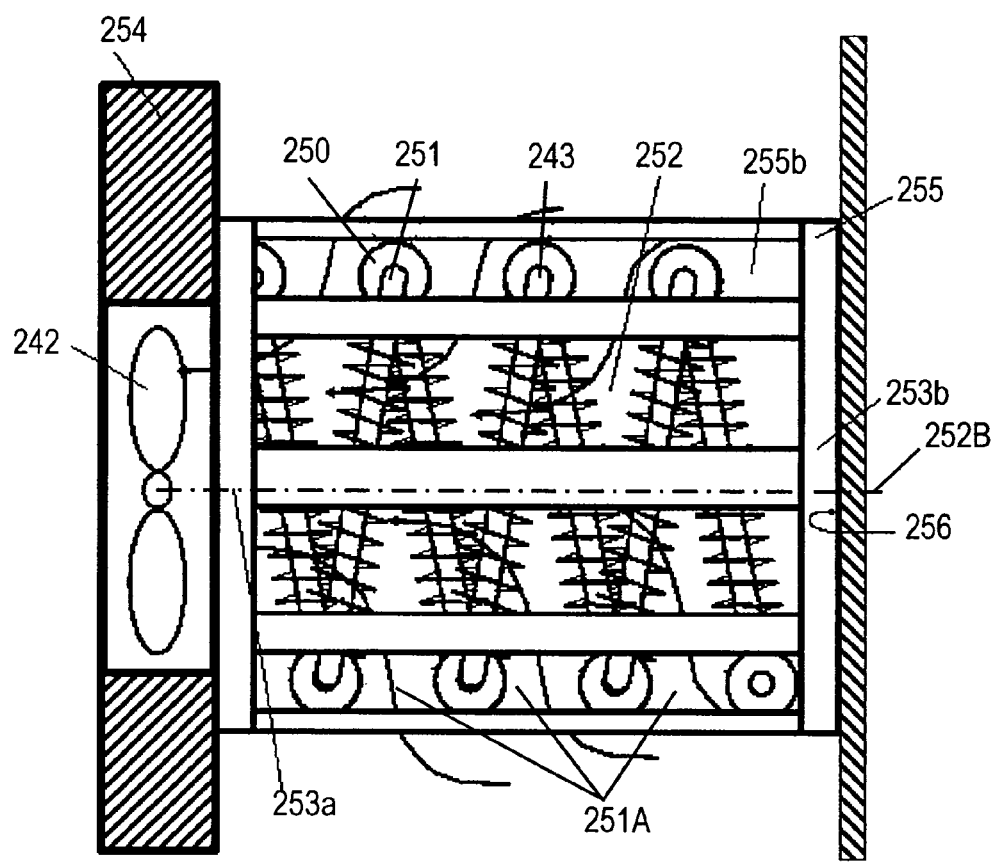
FIG. 11 is a schematic view of a condenser of the refrigerator according to Embodiment 2.
Figure 12:
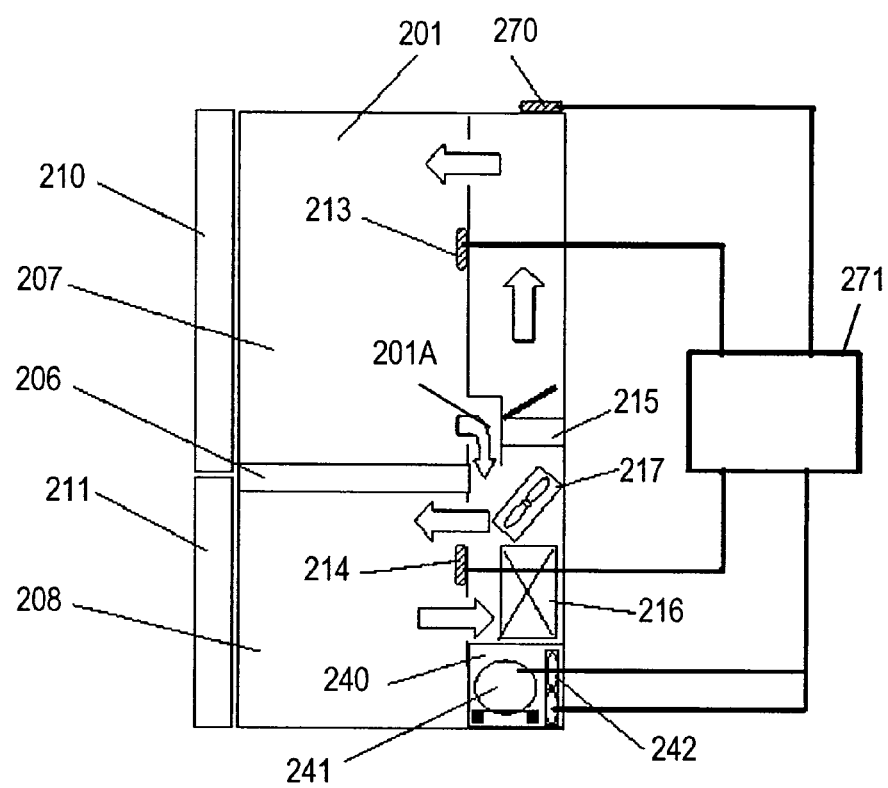
FIG. 12 illustrates an air path of the refrigerator according to Embodiment 2.

FIG. 8 is a plan view of a machine compartment 240 of a refrigerator 201 according to Embodiment 2 of the present invention. FIG. 9 is a front view of the machine compartment 240. FIG. 10 is a cross sectional view of the refrigerator 201 at 10-10 shown in FIG. 8. FIG. 11 is a schematic view of a condenser 243 of the refrigerator 201. FIG. 12 illustrates an air path in the refrigerator 201. The refrigerator 201 includes a heat-insulating housing 205. The heat-insulating housing 205 includes an outer box 202 made of steel and having an opening at its front, an inner box 203 made of hard resin material, and an insulator 204, such as urethane, filling between the outer box 202 and the inner box 203. The heat-insulating housing 205 is separated by a partition 206 into a cool refrigerator compartment 207 and a freezer compartment 208. The refrigerator compartment 207 and the freezer compartment 208 have doors 210 and 211, respectively. The heat-insulating housing 205 is sealed with gaskets (not shown) between the doors 210 and 211. Temperature sensors 213 and 214 measure temperatures in the refrigerator compartment 207 and the freezer compartment 208, respectively. A damper 215 adjusts the amount of cool air introduced into the refrigerator compartment 207. An evaporator 216 is mounted on a back side of the refrigerator compartment 208, and receives air from a fan 217. The machine compartment 240 is located at the lower rear of the refrigerator compartment 201. The evaporator 216 is included in a refrigeration cycle.

The machine compartment 240 accommodates therein a compressor 241, a blower 242 for blowing air, a condenser 243, a portion of capillary tube (not shown) functioning as a decompressor, and a dryer (not shown) which are included in the refrigeration cycle. The condenser 243, the blower 242, and the compressor 241 are arranged in this order from a wall 256 of the machine compartment 240, and thus, the compressor 241 is located at the downstream of air from the blower 242. The heat-insulating housing 205 and the machine compartment 240 provides a cabinet of the refrigerator 201.

Similar to the condenser 143 of Embodiment 1 shown in FIG. 4, the condenser 243 includes a pipe 251 which has fin 250 attached thereto and which is shaped in helical by gaps 251A. The helical shape of the pipe 251 has an inner space 252 having a substantially tubular shape between opening 253a and opening 253b opposite to opening 253a. The inner space 252 extends along a center axis 252B from the opening 253a to the opening 253b. The blower 242 is mounted with screws onto the partition 254 in the machine compartment 240. The condenser 243 is surrounded by a flow-control guide 255 which is fixed to the blower 242 with screws so that the blower 242 faces the opening 253a of the inner space 252. The opening 253b is located close to and in substantially direct contact with the wall 256 of the machine compartment 240. Since the wall 256 substantially closes the opening 253b, the opening 253b has a flow resistance larger than flow resistances of opening 253a and the gap 251A. An air inlet 257 is provided at the lower rear of the machine compartment 240 and at the upstream of the air from the blower 242. The air inlet 257 communicates with an air inlet 257A. The flow-control guide 255 located around the condenser 243 has a tubular shape having a center axis extending in parallel with the center axis 252B and surrounds the pipe 251. The flow-control guide 255 has ventilation slots 255a to 255e provided therein and aligned perpendicularly to the center axis 252B. The ventilation slots 255a to 255e extend in parallel to the center axis 252B. The ventilation slot 255a is the nearest to the air inlet 257A among the ventilation slots. While the ventilation slot 255b is farther from the air inlet 257A than the ventilation slot 255a is, the ventilation slot 255c is farther from the air inlet 257A than the ventilation slot 255b is. The ventilation slot 255d is farther from the air inlet 257A than the ventilation slot 255c is. The ventilation slot 255e is the farthest from the air inlet 257A among the ventilation slots. The ventilation slot 255a has a size smallest among the sizes of the ventilation slots. While the ventilation slot 255b has a size larger than that of the ventilation slot 255a, the ventilation slot 255c has a size larger than that of the ventilation slot 255b. The ventilation slot 255d has a size larger than that of the ventilation slot 255c. The ventilation slot 255e has a size largest among the ventilation slots. In other words, the ventilation slots have the sizes greater as being located farther from the air inlet 257A.

The machine compartment 240 is formed of the outer box 202, a base plate 259 having the compressor 241 fixed thereto, and a cover plate 260. The cover plate 260 has an air outlet 261 provided therein. A is introduced from front air inlets 263 provided at the front lower of the refrigerator 201 into the inside of the machine compartment 240.

A temperature sensor 270 is provided on the top outer surface of the refrigerator 201 for measuring an ambient temperature. The temperatures measured with the sensors 213, 214, and 270 are then supplied to a controller 271 for controlling the blower 242.

An operation of the refrigerator 201 will be described below. The arrangement and a refrigeration cycle of the refrigerator 202 are substantially identical to those of the refrigerator 201 of Embodiment 1, and their descriptions are provided in no more detail.

First, a cooling operation of the freezer compartment 208 will be described. The temperature in the freezer compartment 208 rises to that higher than a predetermined startup temperature due to heat entering from the outside or heat entering upon the opening and closing of the doors 210 and 211. The temperature sensor 214 detects the rising of the temperature, and starts a cooling operation of the compressor 241.

The cooling operation of the refrigerator compartment 207 will be explained below. When the temperature in the refrigerator compartment 207 detected by the temperature sensor 214 rises to a predetermined startup temperature, the refrigerator compartment damper 215 opens, and an operation of the compressor 241 starts. A cool air from the evaporator 216 is introduced by the fan 217 into the refrigerator compartment 201. The cool air cools the refrigerator compartment 201. The temperature in the refrigerator compartment 201 detected by the temperature sensor 214 accordingly falls to that lower than a first stopping temperature. When the temperature detected by the sensor 214 falls to that lower than a second stopping temperature, the operation of the compressor 241 stops. The damper 215 provided in the air path 201A between the refrigerator compartment 207 and the evaporator 216 is shut up when the temperature in the refrigerator compartment 207 falls to that lower than the second stopping temperature. The above operation prevents the temperature in the refrigerator compartment 207 from falling, and thus prevents the refrigerator compartment 207 from being frozen even if the compressor 241 continues to operate while the temperature in the freezer compartment 208 is higher than the first stopping temperature.

The controller 271 starts the blower 242 when the ambient temperature is high, for example, 10° C. at the starting of the compressor 241. When the ambient temperature is lower than 10° C., the controller does not activate the blower 242. When the ambient temperature is low, a condensation pressure decreases more significantly than an evaporation pressure. Then, the difference between the condensation pressure and the evaporation pressure decreases, accordingly decreasing the refrigerant passing through the capillary (not shown). This prevents a sufficient the amount of the evaporation from being ensured, accordingly raising the temperature in the refrigerator compartment 201. The blower 242 according to this embodiment is turned off during the operation of the compressor 241, and keeps the condensation pressure, that is, the condensation temperature. This prevents the circulating refrigerant from decreasing, hence ensuring the cooling capability.

The heat exchange in the condenser 243 during the operation of the blower 242 will be explained in detail. The air flow 2001 runs from the air inlet 257 and the air inlet 257A along the side walls of the condenser 243 to the flow-control guide 255. The air inlet 257A of the flow-control guide 255 having a small area has a flow resistance larger than that of the air inlets 257, and spreads the air flow 2001 along the outer surface of the flow-control guide 255. Air flows around the condenser 243 more through the ventilation slots having small flow resistances, that is, having large sizes. This allows the air to pass uniformly through the ventilation slots 255a to 255e and run through the gaps 251A of the pipe 251 of the condenser 243. This air facilitates the heat exchange performed by the pipe 251 and the fin 250 on the pipe 251. This reduces the compression ratio and increases the cycle COP, accordingly reducing the power consumption of the refrigerator 201.

The opening 253b of the condenser 243 is closed substantially with the wall 256 of the machine compartment 240, and hence, does not require another component, such as a cover, hence reducing its overall cost and its installation area.

The opening 253b of the inner space 252 of the condenser 243 is close to and closed substantially by the wall 256 of the machine compartment 240. The opening 253b of the condenser 243 may be spaced slightly from the wall 256 for preventing a vibration from propagating. The distance between the wall 256 and the opening 253b of the condenser 243 is determined for making the flow resistance of the opening 253b larger than that of the gap 251A of the pipe 251. This arrangement provides the same effects as those of Embodiment 2.

The center axis 252B of the inner space 252 of the condenser 243 is linear, however, may be curved or bent, providing the same effects. The pipe 251 of the condenser 243 formed to have the helical shape is formed in the substantially cylindrical shape but may be formed in a substantially square tubular form.

Exemplary Embodiment 3

Figure 13:
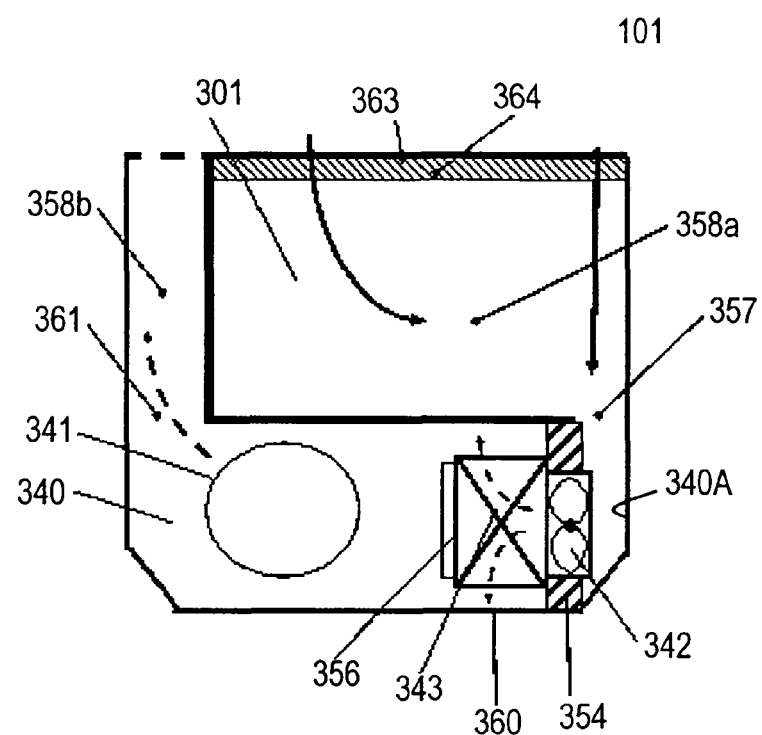
FIG. 13 is a plan view of a machine compartment of a refrigerator according to Exemplary Embodiment 3 of the invention.
Figure 14:
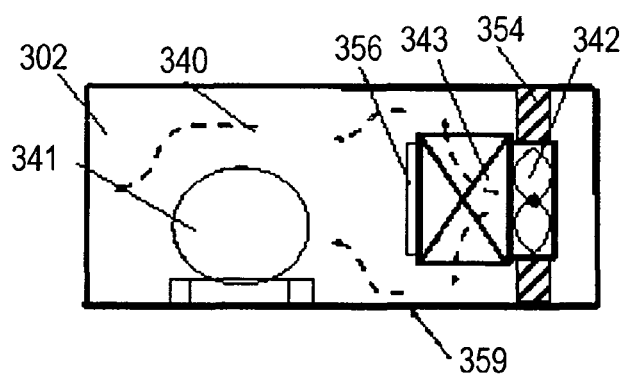
FIG. 14 is a plan view of the machine compartment of the refrigerator according to Embodiment 3.
Figure 15:
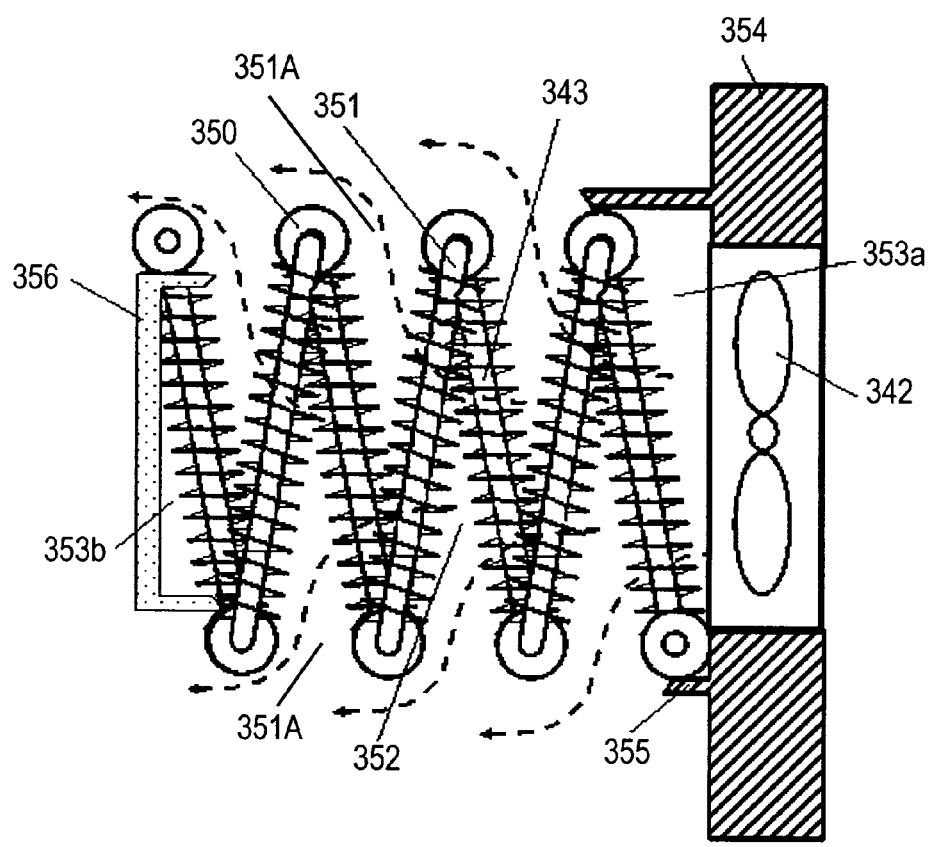
FIG. 15 is a schematic view of a condenser of the refrigerator according to Embodiment 3.
Figure 16:
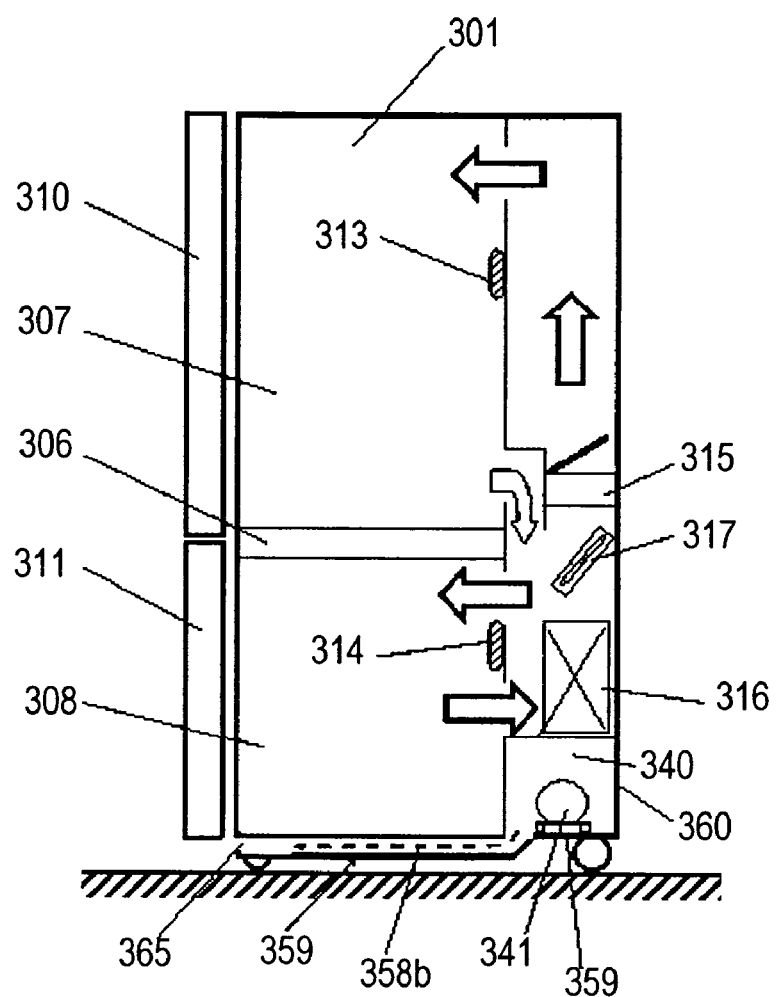
FIG. 16 illustrates an air path of the refrigerator according to Embodiment 3.

FIG. 13 is a plan view of a machine compartment 340 of a refrigerator 301 according to Exemplary Embodiment 3 of the present invention. FIG. 14 is a front view of the machine compartment 340. FIG. 15 is a schematic view of a condenser 343 of the refrigerator 301. FIG. 16 illustrates an air path of the refrigerator 301. The refrigerator 301 includes a heat-insulating housing 105. The heat-insulating housing 105 includes an outer box 102 made of steel and having an opening at its front, an inner box 103 made of hard resin material, and an insulator 104 made of urethane provided between the outer box 102 and the inner box 103. The heat-insulating housing 105 is separated by a partition 106 into a cooling refrigerator compartment 307 and a freezer compartment 308. The refrigerator compartment 307 and the freezer compartment 308 have doors 310 and 311, respectively. Gasket seals between the doors 310 and 311 and the heat-insulating housing 105. Temperature sensors 313 and 314 measure temperatures in the refrigerator compartment 307 and the freezer compartment 308, respectively. A damper 315 controls the flow of cool air introduced into the refrigerator compartment 307. An evaporator 316 included in a refrigeration cycle of the refrigerator 301 is mounted on a back surface of the refrigerator compartment 308. A fan 317 blows air to the evaporator 316. The machine compartment 340 is located at the lower rear of the outside of the refrigerator compartment 301. The heat-insulating housing 105 and the machine compartment 340 provide a cabinet of the refrigerator 301.

The machine compartment 340 accommodates therein components providing the refrigeration cycle, such as a compressor 341, a blower 342 blowing air, a condenser 343, a portion of a capillary tube (not shown) functioning as a decompressor, and a dryer (not shown). The blower 342, the condenser 343, and the compressor 341 are arranged in this order from a wall 340A of the machine compartment 340.

Similar to the condenser 143 of Embodiment 1 shown in FIG. 4, the condenser 343 has a pipe 351 having a fin 350 and is formed to have a helical shape having gaps 351A. The helical shape of the pipe 351 has an inner space 352 having a substantially cylindrical shape between opening 353a and opening 353b opposite to opening 353a. The opening 353a faces the blower 342 mounted with screws onto the partition 354 for separating the machine compartment 340. The condenser 343 is inserted and fixed onto a supporter 355 provided in the partition 354. The opening 353b is closed entirely with a cover 356 which is pressed into the inner space 352. This arrangement provides the opening 353b with a flow resistance larger than flow resistances of other opening 253a and the gap 351A.

An air inlet 357 is provided at the lower rear of the machine compartment 340. The refrigerator 301 has an air intake path 358a and an air discharge path 358 provided at the bottom thereof for introducing the air into the machine compartment 340 and for discharging the air, respectively. A duct 359 is provided at the bottom of the refrigerator 301 for allowing the machine compartment 340 to communicate with the outside of the refrigerator 301. The duct is separated by a cushion tape for defining the air intake path 358a and the air discharging path 358b. The machine compartment 340 is provided by the outer box 302, a base plate 359 to which the compressor 341 is fixed, and a cover plate 360. A filter 364 is provided for receiving the air from a front air inlet 363 of the refrigerator 301. The air is discharged from a front air outlet 365 to the outside of the refrigerator 301. Both the front air inlet 363 and the front air outlet 365 are located at the bottom of the refrigerator 301.

An operation of the refrigerator 301 will be described below.

Heat exchange performed by the condenser 343 will be described. The compressor 341 and the blower 342 are turned on simultaneously. Then, the pressure of the air at the outside of the refrigerator 301 communicating with the machine compartment 340 becomes higher than that near the blower 342. This allows the air to pass the filter 364 in the front air inlet 363 and run across the air intake path 358a and an air inlet 357 to the blower 342.

In the machine compartment 340, the air from the air inlet 357 flows to the blower 342, is then spread radially from the inner space 352 of the condenser 343, and flows along the entire outer surface of the pipe 351. The air contacts the fin 350 provided on the pipe 351, and increases the amount of heat exchanged with each other. This reduces the compression ratio and increases the cycle COP, accordingly reducing the power consumption of the refrigerator 301.

The air introduced from the outside of the refrigerator 301 is drawn through the filter 364, the air intake path 358a, and the air inlet 357 to the machine compartment 340. The air discharged from the blower 342 is discharged through a discharge outlet 361, the air discharging path 358b, and, the front discharge outlet 365 to the outside of the refrigerator 301. Air at the outside with dusts and dirt is shut by the filter 364 while not entering through another path. This prevents the condenser 343 from having dusts or dirt attached thereto, and allows the refrigerator 301 to have a large heat radiation capability throughout a long-run operation and thus to have a small power consumption.

The filter 364 is located at the lower front of the refrigerator 301 of Embodiment 3, however, may be mounted in the air inlet 357, providing the same effects.

INDUSTRIAL APPLICABILITY

A refrigerator according to the present invention includes a machine compartment having a predetermined volume and a condenser. The condenser has a large heat radiation capability, a large heat-exchange efficiency, and a large COP of a cooling system, while the refrigerator has a small power consumption. This refrigerator is prevented from the leakage of a refrigerant caused by injury of a pipe of the condenser during its assembly process or its transportation.

REFERENCE NUMERALS

101 Refrigerator
140 Machine Compartment
142 Blower
143 Condenser
150 Fin
151 Pipe
152 Inner Space
153a Opening
153b Opening
156 Cover
157a Air Inlet
201 Refrigerator
240 Machine Compartment
242 Blower
243 Condenser
250 Fin
251 Pipe
252 Inner Space
253a Opening
253b Opening
257 Air Inlet
255 Flow-Control Guide
255a Ventilation Slot
271 Controller
301 Refrigerator
340 Machine Compartment
342 Blower
343 Condenser
350 Fin
351 Pipe
352 Inner Space
353a Opening
353b Opening
356 Cover
357 Air Inlet
358a Air Intake Path
358b Air Discharge Path
364 Filter

The invention claimed is:

1. A refrigerator comprising:
a housing including a cooling compartment and a machine compartment;
a refrigeration cycle provided in the housing, the refrigeration cycle including a compressor, a condenser, a decompressor, and an evaporator, the refrigeration cycle providing a refrigerant path, the condenser accommodated in the machine compartment;
a refrigerant provided in the refrigeration cycle and flowing in the refrigerant path; and
a blower for cooling the condenser,
wherein the condenser includes
a pipe formed to have a helical shape with gaps, the helical shape having an inner space, a first opening, and a second opening opposite to the first opening, the inner space having a substantially cylindrical shape between the first opening and the second opening, and
a fin mounted on the pipe, and
wherein the first opening faces the blower, and a flow resistance between the second opening and the inner space is larger than a flow resistance between the gaps of the helical shape and the inner space.

2. The refrigerator according to claim 1, further comprising a cover for closing at least a portion of the second opening.

3. The refrigerator according to claim 1, wherein the machine compartment has an inner wall located near the second opening of the condenser.

4. The refrigerator according to claim 1, wherein air flows from the gaps of the helical shape into the inner space of the condenser and is discharged from the blower.

5. The refrigerator according to claim 1, wherein air flows from the blower into the inner space of the condenser and is discharged through the gaps to an outside of the inner space.

6. The refrigerator according to claim 1, further comprising a flow-control guide provided around the condenser, the flow-control guide having a plurality of ventilation slots formed therein.

7. The refrigerator according to claim 6,
wherein the machine compartment has an air inlet provided therein for introducing air into the machine compartment, and
wherein the ventilation slots of the flow-control guide include a first ventilation slot and a second ventilation slot located farther from the air inlet than the first ventilation slot, the second ventilation slot having a size larger than a size of the first ventilation slot.

8. The refrigerator according to claim 1, wherein the machine compartment has an air inlet provided therein for introducing air into the machine compartment.

9. The refrigerator according to claim 8, further comprising a filter provided at the housing at an upstream of air from the air inlet of the machine compartment.

10. The refrigerator according to claim 8, wherein the air inlet is located at an upstream of air from the second opening.

11. The refrigerator according to claim 8, wherein the air inlet is provided in a bottom of the housing.

12. The refrigerator according to claim 1, further comprising an air outlet for discharging air from the machine compartment.

13. The refrigerator according to claim 12, wherein the air outlet is provided at a bottom of the housing.

14. The refrigerator according to claim 1, wherein sizes of the gaps of the helical shape of the condenser becomes larger as the gaps are located from the first opening to the second opening.

15. The refrigerator according to claim 1, further comprising a controller operable to activate the blower while the compressor operates, wherein the compressor is located in the machine compartment.

16. The refrigerator according to claim 15, wherein the controller is operable to activate the blower during a portion of a time when the compressor operates, and to stop an operation of the blower during another portion of the time.

17. The refrigerator according to claim 15, wherein the controller is operable to activate the blower while the compressor operates when an ambient temperature outside the refrigerator is not lower than a predetermined temperature.

18. The refrigerator according to claim 15, wherein the controller is operable to stop an operation of the blower while the compressor operates when an ambient temperature outside the refrigerator is lower than a predetermined temperature.

19. The refrigerator according to claim 1, wherein the fin has a thin ribbon shape and is formed to have a helical shape about the pipe.

* * * * *